(12) United States Patent
Liu

(10) Patent No.: US 11,578,154 B2
(45) Date of Patent: Feb. 14, 2023

(54) POLYMER EMULSION AND MANUFACTURING METHOD THEREOF

(71) Applicant: Jen-Yu Liu, Taipei (TW)

(72) Inventor: Jen-Yu Liu, Taipei (TW)

( * ) Notice: Subject to any disclaimer, the term of this patent is extended or adjusted under 35 U.S.C. 154(b) by 0 days.

(21) Appl. No.: 17/207,895

(22) Filed: Mar. 22, 2021

(65) Prior Publication Data

US 2022/0298277 A1    Sep. 22, 2022

(51) Int. Cl.
*C08F 120/56* (2006.01)

(52) U.S. Cl.
CPC .................. *C08F 120/56* (2013.01)

(58) Field of Classification Search
CPC .............. C08F 8/36; C08F 2/28; C09J 133/08
See application file for complete search history.

(56) References Cited

U.S. PATENT DOCUMENTS 3,855,188 A * 12/1974 Uraneck ................ C08F 12/02
526/221

2007/0093626 A1 * 4/2007 Song ..................... C08F 126/04
526/311

* cited by examiner

*Primary Examiner* — Robert D Harlan
(74) *Attorney, Agent, or Firm* — Joseph C. Zucchero; Carolyn S. Elmore; Elmore Patent Law Group, P.C.

(57) ABSTRACT

A method for manufacturing a polymer emulsion includes the following steps. A mixture is heated to a first temperature less than or equal to about 40° C. The mixture including about 100 to about 500 parts by weight of a monomer and about 0.5 to about 95 parts by weight of a first cross-linking agent, in which the monomer has a structure of formula (I):

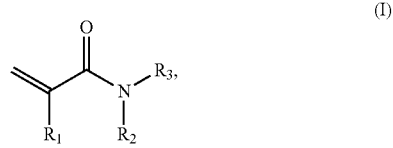

(I)

and $R_1$, $R_2$, and $R_3$ represent H or C1-C4 alkyl group, respectively. About 0.005 to about 5 parts by weight of a first initiator is added. About 0.003 to about 5 parts by weight of a reducing agent is added to form an intermediate product. The intermediate product is heated to a second temperature less than or equal to about 92° C.

16 Claims, No Drawings

POLYMER EMULSION AND MANUFACTURING METHOD THEREOF

BACKGROUND

Field of Invention

The present disclosure relates to a polymer emulsion and a method of manufacturing a polymer emulsion.

Description of Related Art

A polymer emulsion has been widely applied on various products. Manufacturers are devoted to increase the concentration of the polymer emulsion and the molecular weight of polymer in the polymer emulsion to meet the needs of various consumers. However, the polymer emulsion with a high concentration usually has bad storage stability and is difficult to transport, and therefore that brings inconvenience to consumers. Moreover, traditional methods for manufacturing the polymer emulsion are usually performed under an inert atmosphere, such as nitrogen atmosphere, and therefore the production costs increase.

In view of the descriptions above, it is necessary to develop a new method of manufacturing a polymer emulsion.

SUMMARY

The present disclosure provides a method for manufacturing a polymer emulsion. The method includes the following steps. (a) A mixture is heated to a first temperature less than or equal to about 40° C. The mixture includes about 100 to about 500 parts by weight of a monomer and about 0.5 to about 95 parts by weight of a first cross-linking agent, in which the monomer has a structure of formula (I):

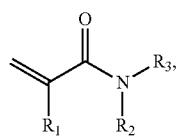

and $R_1$, $R_2$, and $R_3$ represent H or C1-C4 alkyl group, respectively. (b) About 0.005 to about 5 parts by weight of a first initiator is added. (c) About 0.003 to about 5 parts by weight of a reducing agent is added to form an intermediate product. (d) The intermediate product is heated to a second temperature less than or equal to about 92° C.

In some embodiments, any one of the steps (a)-(d) is performed under an atmospheric environment.

In some embodiments, the method further includes the following steps. Before the step (a), the monomer and a solvent are mixed to form a solution, in which the monomer has a concentration less than or equal to about 25 wt %. The first cross-linking agent is added into the solution to form the mixture.

In some embodiments, the first cross-linking agent is selected from the group consisting of polydiallyldimethylammonium chloride (polyDADMAC), N,N-dimethylacrylamide (DMAA), N-[(3-dimethylamino)-propyl] methacrylamide (DMAPAA), acrylic acid (AA), hydroxyethyl acrylate, hydroxypropyl acrylate, methacrylic acid, hydroxyethyl methacrylate, hydroxypropyl methacrylate, divinylbenzene, N-methylolacrylamide, diacetone acrylamide, and glyoxal.

In some embodiments, the first cross-linking agent includes about 0.1 to about 15 parts by weight of N,N-dimethylacrylamide (DMAA) and about 0.1 to about 10 parts by weight of acrylic acid (AA).

In some embodiments, the first cross-linking agent further includes less than or equal to about 90 parts by weight of polydiallyl dimethyl ammonium chloride (polyDADMAC).

In some embodiments, the first cross-linking agent further includes less than or equal to about 20 parts by weight of N-[(3-dimethylamino)-propyl] methacrylamide (DMAPAA).

In some embodiments, the first initiator is selected from the group consisting of ammonium persulphate (APS), potassium persulphate, sodium persulphate, benzoyl peroxide, lauroyl peroxide, dicyclohexyl peroxydicarbonate, tert-butyl peroctoate, tert-amyl peroctoate, di-tert-butyl peroxy azelate, tert-butyl peracetate, 2,2'-azobis(2-(2-imidazolin-2-yl) propane)dihydrochloride), and 2,2'-azobis(2-methylpropionamidine) dihydrochloride.

In some embodiments, the reducing agent is selected from the group consisting of sodium bisulfite (SBS), ammonium sulfite, potassium sulfite, sodium metabisulfite, potassium metabisulfite, and ferrous sulfate.

In some embodiments, the method further includes: before the step (a), adding less than or equal to about 0.6 parts by weight of a chain transfer agent into the mixture.

In some embodiments, the chain transfer agent is selected from the group consisting of sodium formate and sodium hypophosphite.

In some embodiments, the monomer is selected from the group consisting of acrylamide and methacrylamide.

In some embodiments, the method further includes: after the step (d), adding about 0.001 to about 8 parts by weight of a second initiator.

In some embodiments, the second initiator is selected from the group consisting of ammonium persulphate (APS), potassium persulphate, sodium persulphate, benzoyl peroxide, lauroyl peroxide, dicyclohexyl peroxydicarbonate, tert-butyl peroctoate, tert-amyl peroctoate, di-tert-butyl peroxy azelate, tert-butyl peracetate, 2,2'-azobis(2-(2-imidazolin-2-yl) propane)dihydrochloride), and 2,2'-azobis(2-methylpropionamidine) dihydrochloride.

In some embodiments, the method further includes: after the step (d), adding less than or equal to about 0.05 parts by weight of a second cross-linking agent.

In some embodiments, the second cross-linking agent is selected from the group consisting of polydiallyldimethylammonium chloride (polyDADMAC), N,N-dimethylacrylamide (DMAA), N-[(3-dimethylamino)-propyl] methacrylamide (DMAPAA), acrylic acid (AA), hydroxyethyl acrylate, hydroxypropyl acrylate, methacrylic acid, hydroxyethyl methacrylate, hydroxypropyl methacrylate, divinylbenzene, N-methylolacrylamide, diacetone acrylamide, and glyoxal.

A polymer emulsion is made by the method for manufacturing the polymer emulsion of the present disclosure mentioned in any one of the above embodiments. The polymer emulsion includes a polymer having a molecular weight between about 900,000 to about 1,550,000 daltons and has a solids content between about 8 to about 30 wt %.

In some embodiments, the polymer emulsion has a viscosity of about 1500 to about 4500 cPs.

These and other features, aspects, and advantages of the present disclosure will become better understood with reference to the following description and appended claims.

It is to be understood that both the foregoing general description and the following detailed description are by examples, and are intended to provide further explanation of the invention as claimed.

DETAILED DESCRIPTION

The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure provides a method for manufacturing a polymer emulsion. The method includes the following steps. (a) A mixture is heated to a first temperature less than or equal to about 40° C. The mixture includes about 100 to about 500 parts by weight of a monomer and about 0.5 to about 95 parts by weight of a first cross-linking agent, in which the monomer has a structure of formula (I):

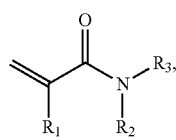

and $R_1$, $R_2$, and $R_3$ represent H or C1-C4 alkyl group, respectively. (b) About 0.005 to about 5 parts by weight of a first initiator is added. (c) About 0.003 to about 5 parts by weight of a reducing agent is added to form an intermediate product. (d) The intermediate product is heated to a second temperature less than or equal to about 92° C.

In some embodiments, C1-C4 alkyl group represents methyl, ethyl, n-propyl, isopropyl, n-butyl, s-butyl, t-butyl, or isobutyl. In some embodiments, the monomer is selected from the group consisting of acrylamide and methacrylamide. Specifically, when the monomer is acrylamide, in the formula (I), $R_1$, $R_2$, and $R_3$ represent H, respectively. When the monomer is methacrylamide, in the formula (I), $R_1$ represent methyl (—$CH_3$), and $R_2$ and $R_3$ represent H, respectively. In some embodiments, the mixture includes one kind of monomer or different kinds of monomers.

The weight of each of the reactants is in a specific range, and therefore the polymer emulsion of the present disclosure made by the manufacturing method described above has a high solids content and a viscosity suitable for transportation in a pipeline. Moreover, the polymer in the polymer emulsion has a high molecular weight; as a result, the polymer emulsion may have a wide applicability to meet the needs of various consumers. Furthermore, the polymer emulsion of the present disclosure has good storage stability. Specifically, after being placed at room temperature for two years, the polymer emulsion is still mixed homogeneously and not layered.

In some embodiments, a polymer emulsion is made by the method for manufacturing the polymer emulsion of the present disclosure. The polymer emulsion includes a polymer having a molecular weight between about 900,000 to about 1,550,000 daltons and has a solids content between about 8 to about 30 wt %. In some embodiments, the polymer emulsion has a viscosity of about 1500 to about 4500 cPs.

Please refer to the step (a). The first temperature is less than or equal to about 40° C.; hence, an explosive polymerization can be avoided. In some embodiments, the first temperature is between about 15° C. and 40° C. For example, the first temperature is 15, 20, 25, 30, 35, or 40° C., but not limited thereto.

In some embodiments, the first cross-linking agent is selected from the group consisting of polydiallyldimethylammonium chloride (polyDADMAC), N,N-dimethylacrylamide (DMAA), N-[(3-dimethylamino)-propyl] methacrylamide (DMAPAA), acrylic acid (AA), hydroxyethyl acrylate, hydroxypropyl acrylate, methacrylic acid, hydroxyethyl methacrylate, hydroxypropyl methacrylate, divinylbenzene, N-methylolacrylamide, diacetone acrylamide, and glyoxal. In some embodiments, the first cross-linking agent includes about 0.1 to about 15 parts by weight of N,N-dimethylacrylamide (DMAA), and about 0.1 to about 10 parts by weight of acrylic acid (AA). In some embodiments, the first cross-linking agent further includes less than or equal to about 90 parts by weight of polydiallyl dimethyl ammonium chloride (polyDADMAC). In some embodiments, the first cross-linking agent further includes less than or equal to about 20 parts by weight of N-[(3-dimethylamino)-propyl] methacrylamide (DMAPAA).

Please refer to the step (b). In some embodiments, the first initiator is added by multiple times, for example, 3-6 times, to control the temperature rise. In some other embodiments, the first initiator is added by dripping until the temperature rises to the second temperature. In some embodiments, after adding the first initiator, the reaction time is in a range between about 5 to about 13 minutes.

In some embodiments, the first initiator is selected from the group consisting of ammonium persulphate (APS), potassium persulphate, sodium persulphate, benzoyl peroxide, lauroyl peroxide, dicyclohexyl peroxydicarbonate, tert-butyl peroctoate, tert-amyl peroctoate, di-tert-butyl peroxy azelate, tert-butyl peracetate, 2,2'-azobis(2-(2-imidazolin-2-yl) propane)dihydrochloride), and 2,2'-azobis(2-methylpropionamidine) dihydrochloride.

Please refer to the step (c). In some embodiments, after adding the reducing agent, the reaction time is in a range between about 0.5 to about 3 minutes.

In some embodiments, the reducing agent is selected from the group consisting of sodium bisulfite (SBS), ammonium sulfite, potassium sulfite, sodium metabisulfite, potassium metabisulfite, and ferrous sulfate.

Please refer to the step (d). The second temperature is less than or equal to about 92° C.; hence, a polymer hydrolysis can be avoided. In some embodiments, the second temperature is between about 80° C. and 92° C. For example, the second temperature is 80, 82, 84, 86, 88, 90 or 92° C., but not limited thereto. In some embodiments, after heating the intermediate product, the reaction time is in a range between about 1.5 to about 3.5 hours.

In some embodiments, any one of the steps (a)-(d) is performed under an atmospheric environment. Because the weight of each of the reactants is in a specific range, the method of the present disclosure is not necessary to be performed under an inert atmosphere, for example, nitrogen atmosphere. Therefore, the production costs can be decreased, and the production processes are simple.

In some embodiments, the method further includes the following steps. Before the step (a), the monomer and a solvent are mixed to form a solution, in which the monomer has a concentration less than or equal to about 25 wt %. The first cross-linking agent is added into the solution to form the mixture. The concentration of the monomer is less than or equal to about 25 wt % to avoid that an explosive polymerization occurs. In some embodiments, the concentration of the monomer is between about 20 wt % to about 25 wt %. In some embodiments, the solvent is water.

In some embodiments, the method further includes: before the step (a), adding less than or equal to about 0.6 parts by weight of a chain transfer agent into the mixture. In some embodiments, the chain transfer agent is selected from the group consisting of sodium formate and sodium hypophosphite.

In some embodiments, the method further includes: after the step (d), adding about 0.001 to about 8 parts by weight of a second initiator. The second initiator can react with unreacted free monomers. In some embodiments, the second initiator is selected from the group consisting of ammonium persulphate (APS), potassium persulphate, sodium persulphate, benzoyl peroxide, lauroyl peroxide, dicyclohexyl peroxydicarbonate, tert-butyl peroctoate, tert-amyl peroctoate, di-tert-butyl peroxy azelate, tert-butyl peracetate, 2,2'-azobis(2-(2-imidazolin-2-yl) propane)dihydrochloride), and 2,2'-azobis(2-methylpropionamidine) dihydrochloride. In some embodiments, the reaction time is in a range between about 1 to about 3 hours.

In some embodiments, the method further includes: after the step (d), adding less than or equal to about 0.05 parts by weight of a second cross-linking agent. In some embodiments, the second cross-linking agent is selected from the group consisting of polydiallyldimethylammonium chloride (polyDADMAC), N,N-dimethylacrylamide (DMAA), N-[(3-dimethylamino)-propyl] methacrylamide (DMAPAA), acrylic acid (AA), hydroxyethyl acrylate, hydroxypropyl acrylate, methacrylic acid, hydroxyethyl methacrylate, hydroxypropyl methacrylate, divinylbenzene, N-methylolacrylamide, diacetone acrylamide, and glyoxal. For example, the second cross-linking agent includes glyoxal. In some embodiments, the crosslinking reaction is performed at room temperature. In some embodiments, the reaction time is in a range between about 64 hours to about 80 hours. For example, the reaction time is 64, 68, 72, 76, or 80 hours.

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended. It is to be further understood that resort may be had to various other embodiments, modifications, and equivalents thereof which may suggest themselves to those skilled in the art without departing from the spirit of the present disclosure and/or scope of the appended claims.

Experiment 1

Preparation of Polymer Emulsion

Experimental conditions and results of Examples 1-17 and Comparative Examples 1-4 are listed in the following Tables 1-4. Examples 1-17 were performed under an atmospheric environment. In other words, Examples 1-17 is not performed under an inert atmosphere, for example, nitrogen atmosphere. In Example 1, 100 parts by weight of a monomer, acrylamide, was added to 373.5 parts by weight of solvent, water. The aqueous solution was mixed with a first cross-linking agent including 0.33 parts by weight of polydiallyl dimethyl ammonium chloride (polyDADMAC), 0.33 parts by weight of acrylic acid (AA), 0.33 parts by weight of N, N-dimethylacrylamide (DMAA), and 0.001 parts by weight of a chain transfer agent, sodium formate. The mixture was stirred and heated to a first temperature of 35° C. 0.2 parts by weight of a first initiator, ammonium persulphate (APS), was added, and the reaction time was about 5 minutes. 0.3 parts of a reducing agent, sodium bisulfite (SBS) was added, and the reaction time was about 30 seconds. The intermediate product was heated to a second temperature of about 90° C., and the second temperature was maintained for 1.5 hours. 0.002 parts of a second initiator, ammonium persulphate (APS), was added, and the reaction time was 1 hour at the second temperature. A polymer emulsion was obtained. The polymer emulsion has a solids content of about 16% and an intrinsic viscosity of 3285 cPs at 25° C. The polymer in the polymer emulsion has a molecular weight of 1.32 million daltons.

The intrinsic viscosity is measured by a method for measuring an intrinsic viscosity of polyacrylamide. The average molecular weight is analyzed by matrix assisted laser desorption/ionization time-of-flight secondary ion mass spectrometry (MALDI TOF-SIMS). Furthermore, the solids content is measured by a method for measuring a solids content of polyacrylamide, GB12005. 2-89.

Other Examples 2-17 were also formed by the processes described in Example 1; however, the reactants, the experimental conditions and results were different from that in Example 1. It is noted that Examples 10 and 13 used N-[(3-dimethylamino)-propyl] methacrylamide (DMAPAA) as a part of the first cross-linking agent. In Example 17, after adding the second initiator, APS, a second cross-linking agent, glyoxal, was added, and the crosslinking reaction is performed at room temperature, and the reaction time is about 72 hours.

Comparative Example 1-4 were also formed by processes similar to that described in Example 1; however, the reactants and the weight ratios between the reactants were different from that in Examples 1-17.

TABLE 1

| | | Example | | | | | |
|---|---|---|---|---|---|---|---|
| | | 1 | 2 | 3 | 4 | 5 | 6 |
| Monomer (acrylicamide) (parts by weight) | | 100 | 100 | 400 | 100 | 100 | 100 |
| Solvent (water) (parts by weight) | | 373.5 | 373.5 | 1494 | 373.5 | 373.5 | 373.5 |
| Monomer aqueous solution (wt %) | | 21.1193 | 21.1193 | 21.1193 | 21.1193 | 21.1193 | 21.1193 |
| First cross-linking agent (parts by weight) | Poly-DADMAC | 0.33 | 50 | 50 | 18 | 18 | 18 |
| | AA | 0.33 | 5 | 5 | 1.3 | 1.3 | 1.3 |
| | DMAA | 0.33 | 10 | 10 | 0.9 | 0.9 | 0.9 |
| | DMAPAA | N/A | N/A | N/A | N/A | N/A | N/A |
| Chain transfer agent, sodium formate (parts by weight) | | 0.001 | 0.001 | 0.001 | 0.001 | 0.001 | 0.001 |
| First temperature (° C.) | | 35 | 35 | 35 | 35 | 35 | 35 |
| First initiator, APS (parts by weight) | | 0.2 | 0.034 | 0.034 | 0.01 | 2 | 0.034 |
| Reaction time (min) | | about 5 | about 13 | about 6.5 | about 6.5 | about 6.5 | about 6.5 |
| Reducing agent, SBS (parts by weight) | | 0.3 | 0.081 | 0.081 | 0.081 | 0.081 | 0.005 |
| Reaction time (sec) | | 30 | 180 | 90 | 90 | 90 | 90 |
| Second temperature (° C.) | | about 90 | about 90 | about 90 | about 90 | about 90 | about 90 |
| Heating time (hr) | | 1.5 | 3 | 2 | 2 | 2 | 2 |
| Second initiator, APS (parts by weight) | | 0.002 | 0.002 | 0.002 | 0.002 | 0.002 | 0.002 |
| Heating time (hr) | | 1 | 3 | 2 | 2 | 2 | 2 |
| Second cross-linking agent, glyoxal (parts by weight) | | N/A | N/A | N/A | N/A | N/A | N/A |
| Molecular weight (million dalton) | | 1.32 | 1.17 | 1.20 | 1.24 | 1.06 | 1.24 |
| Solids content (wt %) | | about 16 | about 12 | about 10 | about 13 | about 11 | about 12 |
| Viscosity (cPs) | | 3285 | 1514 | 1551 | 3187 | 2937 | 3175 |

TABLE 2

| | | Example | | | | | |
|---|---|---|---|---|---|---|---|
| | | 7 | 8 | 9 | 10 | 11 | 12 |
| Monomer (acrylicamide) (parts by weight) | | 100 | 250 | 500 | 100 | 100 | 100 |
| Solvent (water) (parts by weight) | | 373.5 | 933.75 | 1867.5 | 373.5 | 373.5 | 373.5 |
| Monomer aqueous solution (wt %) | | 21.1193 | 21.1193 | 21.1193 | 21.1193 | 21.1193 | 21.1193 |
| First cross-linking agent (parts by weight) | Poly-DADMAC | 35.64 | 18 | 18 | 18.24 | 21.44 | 37.09 |
| | AA | 2.574 | 1.3 | 1.3 | 1.34 | 1.5 | 1.55 |
| | DMAA | 1.782 | 0.9 | 0.9 | 0.94 | 1.076 | 1.11 |
| | DMAPAA | N/A | N/A | N/A | 1.7 | N/A | N/A |
| Chain transfer agent, sodium formate (parts by weight) | | 0.2 | 0.05 | 0.2 | N/A | N/A | N/A |
| First temperature (° C.) | | 35 | 35 | 35 | 35 | 35 | 35 |
| First initiator, APS (parts by weight) | | 1 | 2 | 2 | 0.034 | 0.133 | 0.138 |
| Reaction time (min) | | about 6.5 | about 6.5 | about 6.5 | about 6.5 | about 6.5 | about 6.5 |
| Reducing agent, SBS (parts by weight) | | 2 | 0.5 | 0.081 | 0.081 | 0.313 | 0.33 |
| Reaction time (sec) | | 90 | 90 | 90 | 90 | 90 | 90 |
| Second temperature (° C.) | | about 90 | about 90 | about 90 | about 90 | about 90 | about 90 |
| Heating time (hr) | | 2 | 2 | 2 | 2 | 2 | 2 |
| Second initiator, APS (parts by weight) | | 0.002 | 0.002 | 0.002 | 0.002 | 0.002 | 0.002 |
| Heating time (hr) | | 2 | 2 | 2 | 2 | 2 | 2 |
| Second cross-linking agent, glyoxal (parts by weight) | | N/A | N/A | N/A | N/A | N/A | N/A |

TABLE 2-continued

|  | Example | | | | | |
| --- | --- | --- | --- | --- | --- | --- |
|  | 7 | 8 | 9 | 10 | 11 | 12 |
| Molecular weight (million dalton) | 1.41 | 1.00 | 0.94 | 1.24 | 1.26 | 1.26 |
| Solids content (wt %) | about 27 | about 21 | about 26 | about 12.2 | about 15.34 | about 15 |
| Viscosity (cPs) | 2030 | 1557 | 1550 | 3200 | 3150 | 1601 |

TABLE 3

|  |  | Example | | | | |
| --- | --- | --- | --- | --- | --- | --- |
|  |  | 13 | 14 | 15 | 16 | 17 |
| Monomer (acrylicamide) (parts by weight) | | 100 | 100 | 100 | 100 | 100 |
| Solvent (water) (parts by weight) | | 373.5 | 373.5 | 300 | 300 | 300 |
| Monomer aqueous solution (wt %) | | 21.1193 | 21.1193 | 25 | 25 | 25 |
| First cross-linking agent (parts by weight) | Poly-DADMAC | N/A | 35.02 | 72.09 | 84.81 | 84.81 |
| | AA | 1.55 | 2.71 | 1.34 | 1.34 | 1.34 |
| | DMAA | 1.11 | 3.11 | 1.32 | 1.32 | 1.32 |
| | DMAPAA | 18.13 | N/A | N/A | N/A | N/A |
| Chain transfer agent, sodium formate (parts by weight) | | N/A | 0.156 | 0.452 | 0.452 | 0.452 |
| First temperature (° C.) | | 35 | 35 | 35 | 35 | 35 |
| First initiator, APS (parts by weight) | | 0.138 | 0.817 | 0.14 | 0.14 | 0.14 |
| Reaction time (min) | | about 6.5 | about 6.5 | about 6.5 | about 6.5 | about 6.5 |
| Reducing agent, SBS (parts by weight) | | 0.33 | 1.635 | 0.15 | 0.15 | 0.15 |
| Reaction time (sec) | | 90 | 90 | 90 | 90 | 90 |
| Second temperature (° C.) | | about 90 | about 90 | about 90 | about 90 | about 90 |
| Heating time (hr) | | 2 | 2 | 2 | 2 | 2 |
| Second initiator, APS (parts by weight) | | 0.002 | 0.002 | 0.002 | 0.002 | 0.002 |
| Heating time (hr) | | 2 | 2 | 2 | 2 | 2 |
| Second cross-linking agent, glyoxal (parts by weight) | | N/A | N/A | N/A | N/A | 0.03 |
| Molecular weight (million dalton) | | 1.25 | 1.25 | 1.50 | 1.00 | 1.20 |
| Solids content (wt %) | | about 15 | about 25.17 | about 25 | about 25 | about 25 |
| Viscosity (cPs) | | 2600 | 1950 | 4325 | 1875 | 2075 |

TABLE 4

|  |  | Comparative Example | | | |
| --- | --- | --- | --- | --- | --- |
|  |  | 1 | 2 | 3 | 4 |
| Monomer (acrylicamide) (parts by weight) | | 75 | 10 | 99 | 99 |
| Solvent (water) (parts by weight) | | 225 | 30 | 297 | 297 |
| Monomer aqueous solution (wt %) | | 25 | 25 | 25 | 25 |
| First cross-linking agent (parts by weight) | Poly-DADMAC | N/A | 257.25 | 56.595 | 0.08575 |
| | AA | N/A | 19.908 | 4.38 | 0.0066 |
| | DMAA | N/A | 22.845 | 5.03 | 0.0076 |
| | DMAPAA | N/A | N/A | N/A | N/A |
| Chain transfer agent, sodium formate (parts by weight) | | 7.97 | 3.1 | 1 | 0.5 |
| First temperature (° C.) | | 35 | 35 | 35 | 35 |
| First initiator, APS (parts by weight) | | 25 | 0.36 | 0.001 | 100 |
| Reaction time (min) | | about 6.5 | about 6.5 | about 6.5 | about 6.5 |
| Reducing agent, SBS (parts by weight) | | 10 | 40 | N/A | 400 |
| Reaction time (sec) | | 90 | 90 | 90 | 90 |
| Second temperature (° C.) | | about 90 | about 90 | about 90 | about 90 |
| Heating time (hr) | | 2 | 2 | 2 | 2 |
| Second initiator, APS (parts by weight) | | 0.002 | 0.002 | 0.002 | 0.002 |
| Heating time (hr) | | 2 | 2 | 2 | 2 |
| Second cross-linking agent, glyoxal (parts by weight) | | N/A | N/A | N/A | N/A |

TABLE 4-continued

| | Comparative Example | | | |
|---|---|---|---|---|
| | 1 | 2 | 3 | 4 |
| Molecular weight (million dalton) | 0.203 | 0.453 | 0.213 | 0.453 |
| Solids content (wt %) | about 57 | about 57 | about 57 | about 57.4 |
| Viscosity (cPs) | 1948 | 1691 | 1514 | 3250 |

After being placed at room temperature for two years, each of the polymer emulsions of Examples 1-17 is still mixed homogeneously and not layered, and its color is uniformly milky-white. In contrast, after being placed at room temperature for two years, each of the polymer emulsions of Comparative Example 1-4 is layered, and its color is uniformly milky-white.

As shown in Tables 1-3 above, the weight of each of the reactants of Examples 1-17 is in a specific range, and therefore each polymer emulsion has a high solids content, which can be as high as 27 wt %, and a viscosity suitable for transportation in a pipeline, which is less than 5,000 cPs. Moreover, the polymers in the polymer emulsions of Examples 1-17 have a high molecular weight in a range between about 940,000 and about 1,500,000 daltons, which is much greater than that in Comparative Examples 1-4 as shown in Table 4.

Experiment 2

Functional Measurement of Polymer Emulsion

The polymer emulsions of Examples 15-17 were diluted and measure by a particle charge detector (PCD). Specifically, the polymer emulsions were diluted to form diluted polymer emulsions, respectively. Each of the diluted polymer emulsions has a concentration which is 1/1000 of a concentration of the original polymer emulsion. The diluted polymer emulsion of Example 15 has a pH value of 6.53, and the volume of the cationic titration is +97 mL measured by the PCD. The diluted polymer emulsion of Example 16 has a pH value of 6.86, and the volume of the cationic titration is +214 mL measured by the PCD. The diluted polymer emulsion of Example 17 has a pH value of 7.46, and the volume of the cationic titration is +503 mL measured by the PCD.

The polymer emulsions of Examples 15-17 and commercial polymer emulsions were used to manufacture paper, respectively. The polymer emulsions of Examples 15-17 were manufactured under an atmospheric environment. The commercial polymer emulsions were obtained from Kemira and manufactured under nitrogen atmosphere, and their trade names are 98-1 and 85E.

During the papermaking process, the polymer emulsions were added, respectively. The absolutely dry content of the polymer emulsion was 0.5 wt % of the absolutely dry content of the paper fibers, thereby increasing the fiber interweaving. Compared to the papers added with the commercial polymer emulsions, the paper added with the polymer emulsion of Example 15 increased about 2.4% of a paper bursting force. Further, the paper added with the polymer emulsion of Example 16 increased about 14.3% of a paper bursting force. The paper added with the polymer emulsion of Example 17 increased about 17.5% of a paper bursting force. These results proved that the polymer emulsions of the present disclosure can effectively enhance the strength of paper.

In summary, the present disclosure provides a method for manufacturing a polymer emulsion. The method is not necessary to be performed under an inert atmosphere. Therefore, the production costs can be decreased, and the production processes are simple. The polymer emulsion has a high solids content and a viscosity suitable for transportation, and includes a polymer with high molecular weight, but the polymer emulsion still has good storage stability. Accordingly, the polymer emulsion has a wide application on, for example, paper, mining, and water treatment industry.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for manufacturing a polymer emulsion, comprising:
   (a) heating a mixture to a first temperature less than or equal to about 40° C., the mixture comprising about 100 to about 500 parts by weight of a monomer and about 0.5 to about 95 parts by weight of a first cross-linking agent, wherein the monomer has a structure of formula (I):

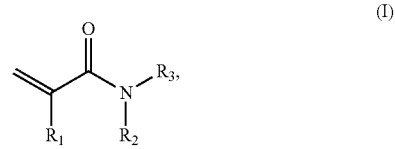

and $R_1$, $R_2$, and $R_3$ represent H or C1-C4 alkyl group, respectively;
   (b) adding about 0.005 to about 5 parts by weight of a first initiator;
   (c) adding about 0.003 to about 5 parts by weight of a reducing agent to form an intermediate product; and
   (d) heating the intermediate product to a second temperature less than or equal to about 92° C.

2. The method of claim 1, wherein any one of the steps (a)-(d) is performed under an atmospheric environment.

3. The method of claim 1, further comprising:
   before the step (a), mixing the monomer and a solvent to form a solution, wherein the monomer has a concentration less than or equal to about 25 wt %; and
   adding the first cross-linking agent into the solution to form the mixture.

4. The method of claim 1, wherein the first cross-linking agent is selected from the group consisting of polydiallyldimethylammonium chloride (polyDADMAC), N,N-dimethylacrylamide (DMAA), N-[(3-dimethylamino)-propyl] methacrylamide (DMAPAA), acrylic acid (AA), hydroxyethyl acrylate, hydroxypropyl acrylate, methacrylic acid, hydroxyethyl methacrylate, hydroxypropyl methacrylate, divinylbenzene, N-methylolacrylamide, diacetone acrylamide, and glyoxal.

5. The method of claim 4, wherein the first cross-linking agent comprises about 0.1 to about 15 parts by weight of N,N-dimethylacrylamide (DMAA) and about 0.1 to about 10 parts by weight of acrylic acid (AA).

6. The method of claim 5, wherein the first cross-linking agent further comprises less than or equal to about 90 parts by weight of N polydiallyl dimethyl ammonium chloride (polyDADMAC).

7. The method of claim 5, wherein the first cross-linking agent further comprises less than or equal to about 20 parts by weight of N-[(3-dimethylamino)-propyl] methacrylamide (DMAPAA).

8. The method of claim 1, wherein the first initiator is selected from the group consisting of ammonium persulphate (APS), potassium persulphate, sodium persulphate, benzoyl peroxide, lauroyl peroxide, dicyclohexyl peroxydicarbonate, tert-butyl peroctoate, tert-amyl peroctoate, di-tert-butyl peroxy azelate, tert-butyl peracetate, 2,2'-azobis (2-(2-imidazolin-2-yl) propane)dihydrochloride), and 2,2'-azobis(2-methylpropionamidine) dihydrochloride.

9. The method of claim 1, wherein the reducing agent is selected from the group consisting of sodium bisulfite (SBS), ammonium sulfite, potassium sulfite, sodium metabisulfite, potassium metabisulfite, and ferrous sulfate.

10. The method of claim 1, further comprising:
before the step (a), adding less than or equal to about 0.6 parts by weight of a chain transfer agent into the mixture.

11. The method of claim 10, wherein the chain transfer agent is selected from the group consisting of sodium formate and sodium hypophosphite.

12. The method of claim 1, wherein the monomer is selected from the group consisting of acrylamide and methacrylamide.

13. The method of claim 1, further comprising: after the step (d), adding about 0.001 to about 8 parts by weight of a second initiator.

14. The method of claim 13, wherein the second initiator is selected from the group consisting of ammonium persulphate (APS), potassium persulphate, sodium persulphate, benzoyl peroxide, lauroyl peroxide, dicyclohexyl peroxydicarbonate, tert-butyl peroctoate, tert-amyl peroctoate, di-tert-butyl peroxy azelate, tert-butyl peracetate, 2,2'-azobis (2-(2-imidazolin-2-yl) propane)dihydrochloride), and 2,2'-azobis(2-methylpropionamidine) dihydrochloride.

15. The method of claim 1, further comprising: after the step (d), adding less than or equal to about 0.05 parts by weight of a second cross-linking agent.

16. The method of claim 15, wherein the second cross-linking agent is selected from the group consisting of polydiallyldimethylammonium chloride (polyDADMAC), N,N-dimethylacrylamide (DMAA), N-[(3-dimethylamino)-propyl] methacrylamide (DMAPAA), acrylic acid (AA), hydroxyethyl acrylate, hydroxypropyl acrylate, methacrylic acid, hydroxyethyl methacrylate, hydroxypropyl methacrylate, divinylbenzene, N-methylolacrylamide, diacetone acrylamide, and glyoxal.

\* \* \* \* \*